UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

ESTERS OF ALKAMINS AND PROCESS OF PRODUCING SAME.

1,150,580.  Specification of Letters Patent.  Patented Aug. 17, 1915.

No Drawing.  Application filed May 22, 1914.  Serial No. 840,329.

*To all whom it may concern:*

Be it known that I, ALEX B. DAVIS, a citizen of the United States, residing at Indianapolis, Marion county, and State of Indiana, have invented and discovered certain new and useful Improvements in Esters of Alkamins and Processes of Producing Same, of which the following is a specification.

This invention relates to esters of alkamins which are derived from new halogen alcohols. The salts of the esters are valuable local anesthetics.

The alkamins are all derived from tertiary alcohols produced by treating chlormethyl-w-brom-propyl ketone of the formula:

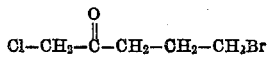

with alkyl magnesium haloids. Thus ethyl magnesium bromid produces the tertiary alcohol of the formula—

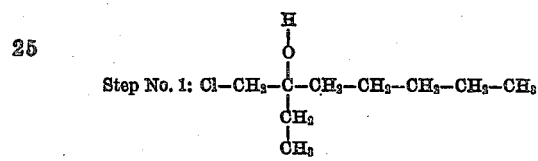

This on being condensed with dimethylamin gives the alkamin of the formula—

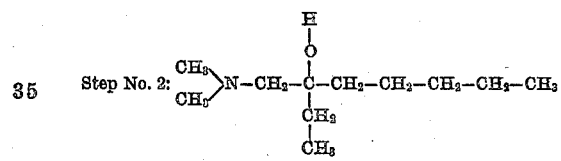

which may be called dimethyl-amino-methyl-ethyl-amyl-carbinol. These esters may be represented by the formula

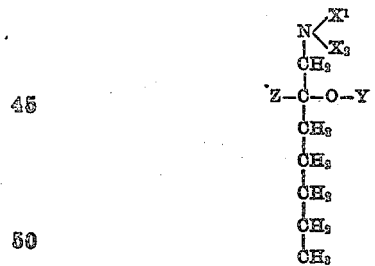

in which $X^1$ and $X^2$ are each alkyl or hydrogen, Y an acid radical and Z a mono-valent group, consisting, in the particular formula, of any alkyl group.

In detail the esters of the alkamins may be formed as follows:

Step No. 3:—173 parts by weight of the above described alkamin are mixed with a considerable volume of any suitable solvent, the mixture heated to boiling and 140.4 parts of benzoyl chlorid dropped in. The resulting reaction mass is placed in a dish on the water bath, the solvent all evaporated, the residue mixed with ten times its weight of boiling acetone, the acetone solution thus obtained filtered and the filtrate evaporated until nearly all the acetone is driven off. The residue soon solidifies to a mass of nearly white crystals which are filtered off and recrystalized from acetone. The resulting crystalline compound probably has the following constitution:—

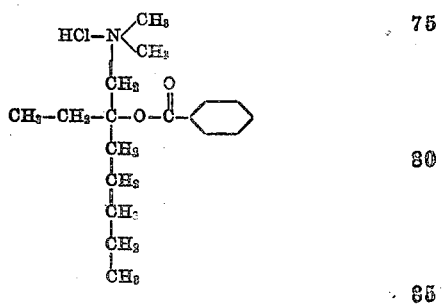

and may be called dimethylamino-methyl-ethyl-amyl-carbinyl-benzoate (carbinol-benzoyl-ester)-hydrochlorid. Many other compounds of similar character may be formed by using other alkyl halogens in place of ethyl bromid in Step No. 1, by using other disubstituted amins in Step No. 2, or by using other acid haloids in Step No. 3. The nucleus contained in any of these compounds may be represented by the formula:—

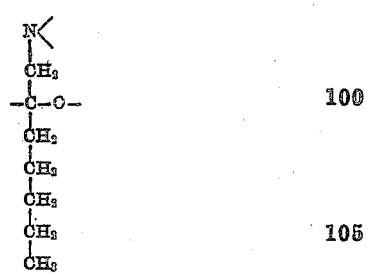

What I claim is:—

1. The process of condensing the halogen tertiary alcohols obtained by the action of alkyl-magnesium haloids on chlor-methyl-w-brom-propyl-ketone, with substituted amins and esterifying the resulting alkamins with an acid radical in a suitable combination.

2. The process of treating the alkamins obtained by condensing chlor-methyl-ethyl-amyl-carbinol with substituted amins and adding an acid chlorid to a solution of the resulting alkamin.

3. The esters of alkamins represented by the following formula

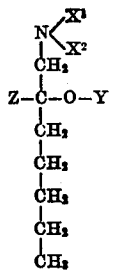

in which $X^1$ and $X^2$ are each alkyl or hydrogen, Y an acid radical and Z a mono-valent group capable of being introduced by means of the Grignard reaction.

4. Compounds containing the following atom group:—

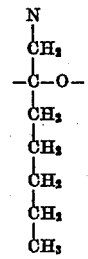

5. The compound having probably the formula:—

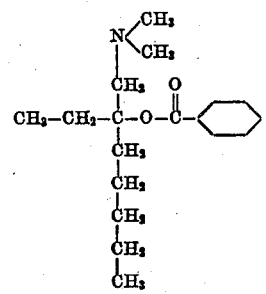

In witness whereof, I have hereunto set my hand and seal at Indianapolis, Indiana, this sixth day of May, A. D. nineteen hundren and fourteen.

ALEX B. DAVIS. [L. S.]

Witnesses:
 E. G. EBERHARDT,
 ARTHUR L. WALTERS.